United States Patent Office 3,282,789
Patented Nov. 1, 1966

3,282,789
STABLE LIQUID COLLOIDAL TANNATE
COMPOSITIONS
Bernard Adolph Marty, Decatur, and Lyle Buddy Lathrop, Mount Zion, Ill., assignors to Neisler Laboratories, Inc., Decatur, Ill., a corporation of Delaware
No Drawing. Filed May 17, 1963, Ser. No. 281,323
22 Claims. (Cl. 167—82)

This invention relates to certain stable colloidal dispersions useful for oral therapeutic purposes and to a process of making and using such compositions.

The invention sought to be patented, in its composition aspect, resides in the concept of a stable colloidal dispersion suitable for oral administration comprising at least one water insoluble therapeutically active tannate salt, a pharmaceutically acceptable alcohol; and a pharmaceutically acceptable gum.

The invention sought to be patented, in its process of making aspect, resides in the concept of making a stable colloidal dispersion, suitable for oral administration, by wetting at least one water insoluble therapeutically active tannate salt and a pharmaceutically acceptable gum with a pharmaceutically acceptable alcohol and mixing the resultant mixture with an aqueous medium.

The invention sought to the patented, in its process of using aspect, resides in the concept of using a tangible embodiment of the composition of matter of this invention, by administering to a mammal such composition for the relief of symptoms amenable to therapy by a therapeutic ingredient contained therein.

Aqueous liquid preparations of water insoluble substances can be prepared in several different ways, e.g., (1) by preparing an oleagenous-aqueous emulsion, (2) by suspending the insoluble particles with a gum or other agent which increases the viscosity of the preparation, (3) by chemical conversion of the active ingredient to a water soluble form, (4) forming a true solution by the use of high concentrations of an alcohol or other organic solvents in the aqueous medium, and (5) forming a colloidal dispersion. Each of these procedures has disadvantages. For example, the first two can produce relatively unstable preparations both from a physical and chemical breakdown of the product. In addition, such suspensions are frequently not "elegant" from the pharmaceutical standpoint of appearance or taste due to the presence of the suspending agents. The third method suffers from the fact that many water insoluble substances are not readily converted into water soluble salts. The fourth procedure has the inherent limitation of the solubility of the selected insoluble substance in the aqueous alcoholic medium and the concentration of solubilizing agents which can be tolerated, particularly when used in pediatric dosage forms. In addition, it is sometimes desirable to retain insolubility of the active ingredient in the dosage form to aid in masking undesirable tastes and for specialized reasons which will be discussed in more detail below. The fifth procedure suffers from the deficiency that it is often difficult or impossible to reduce the particle size to such a fine state of subdivision that the insoluble material is colloidally dispersed and to provide a colloidal system which will not agglomerate to cause subsequent separation of the solid and liquid phases.

Therapeutically active tannate salts present unique problems. They are specifically chosen because of their limited water solubility and their unique properties. Thus, one cannot convert them to a water soluble form for oral aqueous administration as this would alter their properties. Because of the trend away from oleagenous-aqueous suspensions in pharmaceutical preparations this alternative is not attractive. For the reasons given above, suspending agents and solubilizing agents are not desirable. The most desired form is a stable colloidal dispersion or "sol" for reasons of homogeniety, clarity, fluidity, etc., all of which contribute to patient acceptance. However, colloidal dispersions of water insoluble materials are not readily achieved, much less stable colloidal dispersions. Stable colloidal dispersions of the therapeutically active tannates are particularly difficult to obtain.

Therefore, it is an object of this invention to provide stable colloidal dispersions of water insoluble therapeutically active tannates. It is a further object to provide a convenient method of preparing such stable colloidal dispersions. Other objects will be apparent to those skilled in the art to which this invention pertains.

It has now been found that a stable colloidal dispersion of therapeutically active tannates, suitable for oral therapy, can be prepared using a novel combination of water, a pharmaceutically acceptable alcohol, and a pharmaceutically acceptable gum and desirably also glucose. It has been found that such colloidal dispersions, prepared with these ingredients, are pharmaceutically elegant and stable for long periods of time.

The essential components of the composition aspect of this invention are a water insoluble active tannate, a pharmaceutically acceptable alcohol, a pharmaceutically acceptable gum and water. These components interact to provide a uniquely stable colloidal sol or dispersion.

The pharmaceutically active tannates employed in the compositions of this invention are the tannate salts of pharmaceutically active compounds which have limited water solubility, preferably less than one percent soluble in water, but which are capable of being colloidally dispersed in water. Representative classes of such salts and complexes are the tannates of basic substances which include for purposes of illustration but without limiting the generality of the foregoing: antibiotics, certain vitamins, central nervous system stimultants and depressants, tranquilizers, antihistamines, respiratory decongestants, etc., as shown in U.S. Patent 2,950,309 and my copending application Serial Number 130,261, now U.S. Patent No. 3,100,738. The amount of active tannate or tannates present in a composition of this invention will depend upon the activity of the selected tannate and the amount desired per unit dose. With the potent alkaloids, such as atropine and strychnine, a few milligrams per milliliter may suffice. With other tannates of a lower potency per unit weight, a concentration as high as 20 percent in the final product may be employed. Obviously, there are limits to the amounts of tannate which can be colloidally dispersed but this maximum amount is almost invariably much higher than the maximum desired per unit dose. Generally concentrations of up to 10 percent and more usually up to 5 percent are employed.

The term "pharmaceutically acceptable alcohol" as used herein means a normally liquid, non-toxic in the amounts used, mono-, di- or polyhydroxy compound conventionally used in liquid pharmaceutical preparations intended for oral administration. Examples of such alcohols are ethyl alcohol, glycerin, propylene glycol, the polyethylene glycols, the polypropylene glycols, etc. The minimum quantity of particular alcohol used depends on the amount and type of active ingredient to be incorporated in the dispersion, i.e., the minimum amount required to wet the tannate used in the preparation of the dispersion. The maximum amount is controlled by the amount which will be tolerated by the selected gum, the market intended for the product, toxicity, cost, the degree of fluidity desired in the finished product, etc. Generally, an amount less than that required to dissolve the tannate is employed. The preferred range is that amount which will provide a concentration of between 2 and 20 percent of the alcohol (volume/volume) in the final product, preferably about 3 to 10 percent. The most versatile and advantageous pharmaceutically acceptable alcohols for the purpose of this invention are ethyl alcohol, propylene glycol and glycerin, especially glycerin.

The term "pharmaceutically acceptable gum" as used herein means a material which will form a colloidal dispersion in water and is non-toxic in the amounts employed, i.e., the gums conventionally used in liquid pharmaceutical preparations intended for oral administration. Examples of such gums include agar-agar, methyl cellulose, ethyl cellulose, acacia, the pectins, tragacanth, sodium alginate, carboxymethyl cellulose, etc. The gum chosen should be readily "wettable," i.e., one which will hydrate sufficiently fast when stirred into an aqueous medium to provide the shearing effect essential in this invention, as will be described more fully hereinafter. The amount of gum used is not critical within a wide range and the amount which should be used in any particular formulation depends on essentially the same factors as listed for the alcohols. The preferred amounts are those which provide a concentration of the gum in the final product of between about 0.3 and 5.0 percent (weight/volume) and more desirable about 1 to 3 percent (weight/volume). Among the gums which can be employed, pectins are the most desirable for the purposes of this invention.

The compositions of this invention desirably also include glucose, which is preferably employed as liquid glucose, for reasons of economy as well as convenience. The term "liquid glucose" as used herein means any aqueous fluid form of glucose and includes aqueous solutions of substantially pure glucose (liquid glucose, U.S.P.) as well as the impure forms of glucose, e.g., in combination with dextrins and other starch hydrolysates, etc. The type and concentration of liquid glucose used depends on the degree of fluidity desired in the final product, whether it is desired to use large concentrations of alcohol, the cost of the finished products, the type and amount of the therapeutically active ingredient, etc. For example, it has been found that when relatively large amounts of ethyl alcohol or other polar organic solvents are used, e.g., above 10 percent concentration, it is preferably to use liquid glucose, U.S.P. A wide range of concentrations can be employed, i.e., from none up to the limit of solubility of the glucose and other ingredients in the final mixture, e.g. from about 20 to 75 percent, preferably about 40 to 75 percent calculated on the solids content of the liquid glucose.

As would be obvious to one skilled in the art, additional flavors, colors and preservatives, i.e., the usual pharmaceutical excipients, can be incorporated into the compositions of this invention.

The colloidal dispersions of this invention contain water which can be provided by the liquid glucose, if used, or water can be added if a substantially non-aqueous form of glucose is employed. To ensure adequate hydration of the pectin, the dispersion preferably contains at least 20 percent, more preferably at least 25 percent water. The exact amount will, of course, depend in part upon the amount of gum employed. A preferred weight ratio of water to gum is at least 10:1, more preferably 20:1 or more.

The ratio of tannate to alcohol to gum will be determined by factors well known in the art of pharmacy, e.g., solubility, compatibility, viscosity desired, shelf life, i.e., stability required, etc. Generally, the ratio of tannate to gum (weight/weight) will vary from about 1:40 to 10:1, preferably about 1:10 to 1:1, although higher and lower ratios can be employed. The ratio of tannate to alcohol (weight/weight) will vary from about 1:40 to 10:1, preferably about 1:20 to 1:3 although, here again, lower and higher ratios can be employed. Generally speaking, the ratio of tannate to gum will be higher than tannate to alcohol.

The preparation of the stable colloidal dispersion is readily accomplished without prolonged boiling or using a colloidal mill or the other techniques commonly employed for achieving a colloidal dispersion. The starting tannate should be in the form of a relatively fine powder, e.g. 200-mesh screen size or smaller, to ensure uniform wetting of all particles with the alcohol. The tannate and the gum are wet thoroughly, e.g., by triturating, with the selected pharmaceutically acceptable alcohol, separately and then mixed after wetting or simultaneously as a mixture. No attempt is made to dissolve the tannate in the alcohol. It is preferable to use enough alcohol to produce a wet mass at least approaching fluidity, and more preferably which is pourable. The wet paste or slurry is then mixed thoroughly with a pharmaceutical gum. The dry form is ordinarily employed, but it can also be wet thoroughly with the same or another alcohol prior to mixing. It should be noted at this stage no water is present in the mixture (except for minor amounts normally present in the conventional form of the gum and the alcohol). After the tannate, alcohol and gum have been thoroughly mixed, the mixture is then blended with an aqueous medium, using techniques normally employed to prevent caking, e.g. high speed stirring with a "Lightning" or "Waring" blender. Stirring is preferably continued for several minutes, e.g., 10 to 120 minutes, preferably about 30-60 minutes. The aqueous medium can be distilled water, liquid glucose, water-alcohol, water-glucose-alcohol, with or without added suspending, dispersing, wetting and preserving agents, flavorings, colorants, or water-soluble physiologically active ingredients. As will be apparent from the examples, the mixing is preferably performed at temperatures above room temperature, e.g. 40–100° C., more preferably 60–80° C.

The alcohol and gum interact to form the colloidal dispersion. It appears that the alcohol penetrates the gross particles of the tannate. When the alcohol-gum-tannate mixture is mixed with the water, the wetted gum, upon dispersing in the water, causes the tannate particles to break into colloidal size. The mechanism is not unlike an explosion of the gross tannate particles into colloidal particles which immediately form a colloidal dispersion in the aqueous medium. The intimate association of the gum with the tannate prevents the colloidal particles from reaggregating into macro particles, thus producing a stable colloidal dispersion of the tannate.

Glucose appears to enhance the stability of the above-described colloidal dispersions and is therefore preferably incorporated into the aqueous medium, either before or after forming the tannate colloidal dispersion.

The following examples are illustrative only of the novel composition of this invention and the best modes of making and using the invention and are therefore not to be construed as limiting. Unless otherwise indicated, percentages are weight/volume. Temperatures are centigrade.

EXAMPLE 1

| Ingredients | Amount, g. | Concentration (final, w./v.), percent | Range, percent |
|---|---|---|---|
| Tannates: | | | |
|   Dextromethorphan tannate | 10.0 | 0.5 | 0.1–1 |
|   Doxylamine tannate | 4.7 | 0.23 | 0.1–0.5 |
|   Ephedrine tannate | 7.5 | 0.37 | 0.1–1.0 |
| Gum Pectin | 24.0 | 1.2 | 1–3 |
| Alcohol Glycerin | 60.0 | 3.0 | 2–5 |
| Benzoic Acid | 2.0 | 0.1 | |
| Methylparaben | 2.0 | 0.1 | |
| Propylparaben | 0.4 | 0.02 | |
| Glyceryl Guaiacolate | 20.0 | 1.0 | |
| Sorbitan Monooleate | 1.0 | 0.05 | |
| Liquid Glucose (80% solids) | 700 | 35.0 | [1] 20–75 |
| Deionized water | q.s. 2,000 milliliters | | |

[1] Solids.

Warm the glucose to 60 degrees. Bring 480 milliliters of deionized water to the boil and, while stirring with a stirrer fitted with a stainless steel shaft and propeller, add and dissolve the benzoic acid, methylparaben and propylparaben followed by the glyceryl guaiacolate. Mix the dextromethorphan tannate, doxylamine tannate and ephedrine tannate in a mortar. Triturate with part of the glycerin to a paste. Add the remainder of the glycerin and triturate until homogenous. Add the pectin and triturate until homogenous.

Slowly add the tannate-alcohol-gum mixture to the hot preservative-guaiacolate aqueous solution with vigorous agitation. Stir for 15 minutes. Add the sorbitan monooleate and stir for approximately 5 minutes.

Add the aqueous tannate-alcohol-gum mixture to the warm glucose and stir until homogenous using the same stirrer as before.

Make to volume (2000 milliliters) with deionized water and stir for approximately 15 minutes.

Cover and allow to stand overnight. Again q.s. to 2000 milliliters with deionized water and stir for approximately 15 minutes.

Strain through cloth. The resulting aqueous colloidal tannate dispersion is stable for months, showing no sign of precipitation or separation.

EXAMPLE 2

| Ingredients | Amount, g. | Concentration (final, w./v.), percent | Range, percent |
|---|---|---|---|
| Tannates: | | | |
|   Dextromethorphan tannate | 10.0 | 0.5 | 0.1–1 |
|   Doxylamine tannate | 4.7 | 0.23 | 0.1–0.5 |
|   Ephedrine tannate | 7.5 | 0.37 | 0.1–1.0 |
| Gum Pectin | 24.0 | 1.2 | 1–3 |
| Alcohol Glycerin | 60.0 | 3.0 | 2–5 |
| Benzoic acid | 2.0 | 0.1 | |
| Methylparaben | 2.0 | 0.1 | |
| Propylparaben | 0.4 | 0.02 | |
| Sodium citrate | 50.0 | 2.5 | 2–5 |
| Sorbitan monooleate | 1.0 | 0.05 | |
| Liquid glucose (80% solids) | 1,800 | 90.00 | [1] 40–75 |
| Deionized water | q.s. 2,000 milliliters | | |

[1] Solids.

Follow procedure of Example 1 to prepare the stable colloidal dispersion.

EXAMPLE 3

| Ingredients | Amount, g. | Concentration (final, w./v.), percent | Range, percent |
|---|---|---|---|
| Tannates: | | | |
|   d-Methorphan tannate | 10.0 | 0.5 | 0.1–1 |
|   Chloropheniramine tannate | 1.28 | 0.064 | 0.05–0.1 |
|   Ephedrine tannate | 7.5 | 0.37 | 0.1–1 |
| Gum Pectin | 24 | 1.2 | 1–3 |
| Alcohol Glycerin | 60 | [1] 3.0 | 2–5 |
| Liquid glucose (80% solids) | 700 | 35.0 | [2] 25–75 |
| Benzoic acid | 2 | 0.1 | |
| Methylparaben | 2 | 0.1 | |
| Propylparaben | 0.4 | 0.02 | |
| Glyceryl guaiacolate | 20.0 | 1 | |
| Sorbitan monooleate | 1 | 0.05 | |
| Deionized water | q.s. 2,000 milliliters | | |

[1] v./v.
[2] Solids.

Follow the procedure of Example 1 to prepare the stable colloidal dispersion.

EXAMPLE 4

| Ingredients | Amount, g. | Concentration (final, w./v.), percent | Range, percent |
|---|---|---|---|
| Tannate: | | | |
|   d-Methorphan tannate | 10.0 | 0.5 | 0.1–1 |
|   Doxylamine tannate | 4.7 | 0.23 | 0.1–0.5 |
|   Ephedrine tannate | 7.5 | 0.37 | 0.1–1 |
| Alcohol: | | | |
|   Ethanol | 200 | 10.0 | 5–20 |
|   Propylene Glycol | 200 | 10.0 | 5–20 |
| Gum Pectin | 24 | 1.2 | 1–3 |
| Benzoic acid | 2 | 0.1 | |
| Methylparaben | 2 | 0.1 | |
| Propylparaben | 0.4 | 0.02 | |
| Glyceryl guaiacolate | 20 | 1 | |
| Chloroform | 14 | 0.7 | |
| Sorbitan monooleate | 1 | 0.05 | |
| Corn Syrup [1] | 1,200 | 60 | [2] 20–75 |
| Deionized water | q.s. 2,000 milliliters | | |

[1] Staley 36 DE–50% solids.
[2] Solids.

Warm the glucose to 60 degrees C. Bring 450 milliliters of deionized water to the boil and, while stirring with a stirrer fitted with stainless steel shaft and propeller, add and dissolve the benzoic acid, methylparaben and propylparaben followed by the glyceryl guaiacolate.

Mix the dextromethorphan tannate, doxylamine tannate and ephedrine tannate in a mortar. Triturate with part of the propylene glycol to a paste. Add the pectin and enough more propylene glycol to again triturate to a paste. Add the remainder of the propylene glycol and triturate.

Slowly add the tannate-propylene glycol mixture to the hot preservative-guaiacolate solution with vigorous agitation. Stir for approximately 5 minutes. Add the remainder of the propylene glycol and stir for 15 minutes. Add the sorbitan monooleate and stir for approximately 5 minutes.

Add the aqueous tannate-gum-alcohol mixture to the warm glucose and stir until homogenous using the same stirrer as before.

Dilute the ethanol with 100 milliliters of deionized water and add. Stir until homogenous. Add the chloroform and stir until homogenous.

Bring to volume (2000 milliliters) with deionized water and stir for approximately 15 minutes. Cover and allow to stand overnight. Again q.s. to 2000 milliliters with deionized water and stir for approximately 15 minutes. Strain through cloth.

EXAMPLE 5

| Ingredients | Amount, g. | Concentration (final, w./v.), percent | Range, percent |
|---|---|---|---|
| Tannate d-methorphan tannate | 10 | 0.5 | 0.1–1 |
| Gum Pectin | 24 | 1.2 | 1–3 |
| Benzoic acid | 2.0 | 0.1 | |
| Methyl paraben | 2.0 | 0.1 | |
| Propyl paraben | 0.4 | 0.02 | |
| Sorbitan monooleate | 1.0 | 0.05 | |
| Liquid glucose (80% solids) | 1,800 | 90.0 | [1] 40–75 |
| Deionized water | q.s. 2,000 milliliters | | |

[1] Solids.

The above-formulation plus one of the following alcohols is used to prepare suitable stable colloidal dispersions according to the procedure of Example 1: Glycerin, propylene glycol, polyethylene glycol–400, polypropylene glycol–400, and ethyl alcohol, 2–5 percent, preferably about 3 percent.

Follow the procedure of Example 1 to prepare the stable colloidal dispersion.

EXAMPLE 6

| Ingredients | Amount, g. | Concentration (final, w./v.), percent | Range, percent |
|---|---|---|---|
| Tannate d-methorphan tannate | 10 | 0.5 | 0.1–1 |
| Alcohol Glycerin | 60 | [1] 3.0 | 1–5 |
| Benzoic acid | 2.0 | 0.1 | |
| Methyl paraben | 2.0 | 0.1 | |
| Propyl paraben | 0.4 | 0.02 | |
| Sorbitan monooleate | 1.0 | 0.05 | |
| Liquid glucose (80% solids) | 1,800 | 90.00 | [2] 40–75 |

[1] v./v.
[2] Solids.

The above-formulation plus one of the following gums is employed in a manner essentially the same as described in Example 1 to prepare suitable stable colloidal dispersions: acacia, 1–3, preferably 1.2 percent; tragacanth, 1–3, preferably 1.2 percent; sodium alginate, 0.3–1.0 preferably 0.6 percent; and carboxymethylcellulose, 0.3–1.0, preferably 0.4 percent.

EXAMPLE 7

| Ingredients | Amount, g. | Concentration (final, w./v.), percent | Range, percent |
|---|---|---|---|
| Theophylline tannate | 100 | 5.0 | 3–10 |
| Pectin | 24 | 1.2 | 1–3 |
| Glycerin | 120 | [1] 6.0 | 5–10 |
| Preservatives | As in Example 6 | | |
| Liquid glucose (80% solids) | 1,200 | 60 | [2] 40–75 |

[1] v./v.
[2] Solids.

Follow the procedure of Example 1 to prepare the colloidal dispersion.

EXAMPLE 8

| Ingredients | Amount, g. | Concentration (final, w./v.), percent | Range, percent |
|---|---|---|---|
| Pectin | 24 | 1.2 | 1–3 |
| Glycerin | 60 | [1] 3.0 | 2–5 |
| Liquid glucose (80% solids) | 1,600 | 80.0 | [2] 40–75 |

[1] v./v.
[2] Solids.

The following tannates were utilized singly and in combination with the above ingredients:

Chlorpheniramine tannate—0.05–0.2 preferably 0.08%
Pyrilamine tannate and/or phenylephrine tannate—0.05–0.2 preferably 0.1%
Chlorpheniramine tannate—0.02–0.1 preferably 0.04%
Carbetapentane tannate 0.03–0.15 preferably 0.06%
Chlorpheniramine tannate—0.05–0.2 preferably 0.08%
Ephedrine tannate—0.05–0.2 preferably 0.1%
Phenylephrine tannate—0.05–0.2 preferably 0.1%
Strychnine tannate—0.02–0.1 preferably 0.04%
Tetracycline tannate—1.0–10.0 preferably 6.0%

Follow the procedure of Example 1 to prepare the colloidal dispersion.

In each of the above examples, the selected liquid sugar can be omitted or replaced partially or wholly by a synthetic sweetening agent or a non-aqueous form of the sugar with appropriate adjustment of the amount of water employed.

It will be apparent that the above procedure for producing colloidal dispersions will be useful in producing similar dispersions of other water insoluble materials having the physical properties of the tannates with respect to dispersibility. Generally, the material must be substantially water insoluble, wettable by a pharmaceutically acceptable alcohol and compatible with a pharmaceutically acceptable gum so that the three ingredients can be triturated into a stable paste or slurry.

What is claimed is:

1. A liquid composition suitable for oral administration comprising:
   (a) a stable aqueous colloidal dispersion of a water insoluble therapeutically active tannate;
   (b) a pharmaceutically acceptable alcohol; and
   (c) a pharmaceutically acceptable gum.

2. A composition according to claim 1 comprising glucose.

3. A composition according to claim 1 comprising glucose in a concentration of up to 75 percent.

4. A composition according to claim 1 wherein the alcohol is selected from the group consisting of ethyl alcohol, propylene glycol and glycerin.

5. A composition according to claim 1 wherein the gum is selected from the group consisting of pectin, tragacanth, sodium alginate and carboxymethylcellulose.

6. A liquid composition suitable for oral administration comprising:
   (a) a stable aqueous colloidal dispersion of a water insoluble therapeutically active tannate in a concentration up to 10%;
   (b) a pharmaceutically acceptable alcohol in a concentration of 2 to 20 percent; and
   (c) a pharmaceutically acceptable gum in a concentration of from 0.5 to 5.0 percent.

7. A composition according to claim 6 comprising glucose in a concentration of up to 75 percent.

8. A composition according to claim 6 wherein the alcohol is selected from the group consisting of ethyl alcohol, propylene glycol and glycerin.

9. A composition according to claim 6 wherein the gum is selected from the group consisting of pectin, tragacanth, sodium alginate and carboxymethylcellulose.

10. A liquid composition suitable for oral administration comprising:
    (a) a stable aqueous colloidal dispersion of a water insoluble therapeutically active tannate in a concentration of up to 5%;
    (b) glycerin, in a concentration of from 2 to 5 percent; and
    (c) pectin in a concentration of from 0.5 to 5.0 percent.

11. A composition according to claim 10 comprising glucose in a concentration of from 45 to 75 percent.

12. A composition of matter for oral administration comprising
    (a) a stable aqueous colloidal dispersion of a water insoluble therapeutically active tannate in a concentration of up to 5%;
    (b) glycerin, 3–5 percent;
    (c) pectin, 1–3 percent; and
    (d) glucose, 40–75 percent.

13. A stable colloidal aqueous dispersion suitable for oral administration containing:

| | Percent |
|---|---|
| d-Methorphan tannate | 0.1–1.0 |
| Glycerin | 2–5 |
| Pectin | 1–3 |
| Glucose | 40–75 |
| Water and excipients | q.s. |

14. A stable colloidal aqueous dispersion suitable for oral administration containing:

| | Percent |
|---|---|
| Chlorpheniramine tannate | 0.05–0.2 |
| d-Methorphan tannate | 0.1–1.0 |
| Glycerin (v./v.) | 2–5.0 |
| Pectin (w./v.) | 1–3 |
| Glucose (w./v.) | 40–75 |
| Water and excipients | q.s. |

15. A stable colloidal dispersion suitable for oral administration containing:

| | Percent |
|---|---|
| Chlorpheniramine tannate | 0.05–0.1 |
| d-Methorphan tannate | 0.1–1 |
| Ephedrine tannate | 0.1–1 |
| Glycerin (v./v.) | 2–5 |
| Pectin | 1–3 |
| Glucose | 40–75 |
| Water and excipients | q.s. |

16. A stable colloidal dispersion suitable for oral administration containing:

| | Percent |
|---|---|
| Dextromethorphan tannate | 0.1–1 |
| Doxylamine tannate | 0.1–0.5 |
| Ephedrine tannate | 0.1–1 |
| Glycerin (v./v.) | 2–5 |
| Pectin | 1–3 |
| Glucose | 40–75 |
| Water and excipients | q.s. |

17. A stable colloidal dispersion suitable for oral administration containing:

| | Percent |
|---|---|
| Strychnine tannate | 0.02–0.1 |
| Glycerin (v./v.) | 2–5 |
| Pectin | 1–3 |
| Glucose | 40–75 |
| Water and excipients | q.s. |

18. A process of making a stable aqueous liquid colloidal dispersion of a water insoluble tannate suitable for oral administration comprising the steps of
 (a) wetting a water insoluble therapeutically active tannate and a pharmaceutically acceptable gum with a pharmaceutically acceptable alcohol; and
 (b) mixing the resultant mass with stirring with an aqueous medium to produce a colloidal dispersion.

19. A process according to claim 18 wherein the tannate and gum, wet with the alcohol, are mixed with the aqueous medium at between about 40° and 100° C.

20. A process of making a stable aqueous liquid colloidal dispersion of a water insoluble tannate suitable for oral administration comprising the steps of (a) wetting a proportion of a water insoluble therapeutically active tannate as a fine dry powder of not greater than 200-mesh size with an amount of a pharmaceutically acceptable alcohol selected from the group consisting of ethyl alcohol, propylene glycol and glycerine sufficient to produce a pourable mixture but insufficient to dissolve the tannate; (b) mixing the tannate-alcohol mixture with a pharmaceutically acceptable gum colloidally dispersible in water, in an amount from 1:10 to 1:1 by weight of the tannate to the gum, which retains the mixture as a pourable mass; and, (c) dispersing the mixture of alcohol, tannate and gum in an aqueous glucose solution of 40 to 75 percent solids content at 60–80° C.

21. A process according to claim 20, wherein the tannate is d-methorphan tannate, the alcohol is glycerine present in an amount of between 3 and 10 percent by volume of the final product and the gum is pectin present in an amount of from 1 to 3 percent by weight in the final product.

22. The process of orally administering in palatable form a water insoluble therapeutically active tannate which comprises administering to a mammal an effective dose of such tannate as a colloidal dispersion in an aqueous fluid vehicle containing up to 5 percent of the tannate; 2–20 percent of a pharmaceutically acceptable alcohol selected from the group consisting of ethyl alcohol, propylene glycol and glycerine; 1–5 percent of a pharmaceutically acceptable gum, 40–75 percent glucose and at least 20 percent water.

References Cited by the Examiner

UNITED STATES PATENTS

| | | | |
|---|---|---|---|
| 2,939,820 | 6/1960 | Gerber et al. | 167—82 |
| 2,950,309 | 8/1960 | Cavallito | 167—82 X |
| 3,099,602 | 7/1962 | Anderson | 167—55 X |
| 3,100,738 | 8/1963 | Cavallito | 167—82 |

OTHER REFERENCES

Cavallito et al.: J. Am. Ph. A. Sc. Ed. vol. 47, pages 165 to 168, 1958.

Modern Drug Encyclopedia, 9th ed., The Reuben H. Donnelley Corp., New York, N.Y., pages 1220 to 1221.

JULIAN S. LEVITT, *Primary Examiner.*

LEWIS GOTTS, *Examiner.*

G. A. MENTIS, *Assistant Examiner.*